(12) United States Patent
Ochi

(10) Patent No.: US 10,699,000 B2
(45) Date of Patent: Jun. 30, 2020

(54) ELECTRONIC DEVICE AND AUTHENTICATION METHOD

(71) Applicant: KYOCERA Document Solutions Inc., Osaka (JP)

(72) Inventor: Makoto Ochi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 168 days.

(21) Appl. No.: 16/110,765

(22) Filed: Aug. 23, 2018

(65) Prior Publication Data

US 2019/0065727 A1 Feb. 28, 2019

(30) Foreign Application Priority Data

Aug. 25, 2017 (JP) .................. 2017-162158

(51) Int. Cl.
*G06F 3/0488* (2013.01)
*G06F 21/31* (2013.01)
*G06F 21/36* (2013.01)
*G06F 3/0481* (2013.01)

(52) U.S. Cl.
CPC ............ *G06F 21/36* (2013.01); *G06F 3/0481* (2013.01); *G06F 3/04883* (2013.01)

(58) Field of Classification Search
None
See application file for complete search history.

(56) References Cited

U.S. PATENT DOCUMENTS

2015/0113635 A1* 4/2015 Yun ..................... G06F 3/04883
726/19
2016/0335428 A1* 11/2016 Hwang ................ G06F 3/0488

FOREIGN PATENT DOCUMENTS

JP 2014-059767 A 4/2014

* cited by examiner

*Primary Examiner* — Joseph P Hirl
*Assistant Examiner* — Hassan Saadoun
(74) *Attorney, Agent, or Firm* — Studebaker & Brackett PC

(57) ABSTRACT

An electronic device shifts between a locked state in which use of a function is restricted and an unlocked state in which the function is usable. The electronic device includes a touch panel and a controller. The touch panel displays a pattern entry screen including first grid points and a second grid point having the same shape and color as the first grid points. The controller acquires a movement path of a detection target on the pattern entry screen and sequentially specifies first grid points passed by the movement path among the first grid points. The controller acquires entry pattern information based on the specified first grid points. The controller determines whether or not the entry pattern information matches registered pattern information. When the controller determines that the entry pattern information matches the registered pattern information, the electronic device shifts from the locked state to the unlocked state.

8 Claims, 14 Drawing Sheets

US 10,699,000 B2

ELECTRONIC DEVICE AND AUTHENTICATION METHOD

INCORPORATION BY REFERENCE

The present application claims priority under 35 U.S.C. § 119 to Japanese Patent Application No. 2017-162158, filed on Aug. 25, 2017. The contents of this application are incorporated herein by reference in their entirety.

BACKGROUND

The present disclosure relates to an electronic device and an authentication method.

A smartphone, which is a type of electronic device, displays a pattern entry screen. The pattern entry screen receives a release operation of a user to release a screen lock of the smartphone. The pattern entry screen displays a predetermined graphical pattern. The smartphone changes the graphical pattern to prevent unauthorized use by another person. In detail, the smartphone includes a touch panel, a plurality of sensors, and a pattern controller. The sensors are located on a side surface of a casing of the smartphone. The pattern controller displays the pattern entry screen on the touch panel. The pattern controller displays a graphical pattern in the pattern entry screen. The graphical pattern differs according to how the user is to perform an entry operation over the sensors.

SUMMARY

An electronic device according to an aspect of the present disclosure shifts between a locked state in which use of a function is restricted and an unlocked state in which the function is usable. The electronic device includes a touch panel and a controller. The touch panel displays a pattern entry screen including a plurality of first grid points and a second grid point having the same shape and color as the first grid points. The controller acquires a movement path of a detection target on the pattern entry screen and sequentially specifies first grid points passed by the movement path among the plurality of first grid points and the second grid point. The controller specifies only the first grid points passed by the movement path and does not specify the second grid point passed by the movement path when the movement path passes the first grid points and the second grid point. The controller acquires entry pattern information based on the specified first grid points. The controller determines whether or not the entry pattern information matches registered pattern information. When the controller determines that the entry pattern information matches the registered pattern information, the electronic device shifts from the locked state to the unlocked state.

An authentication method according to an aspect of the present disclosure shifts an electronic device between a locked state in which use of a function is restricted and an unlocked state in which the function is usable. The authentication method includes displaying, acquiring, and determining. In the displaying, a pattern entry screen including a plurality of first grid points and a second grid point having the same shape and color as the first grid points is displayed. In the acquiring, only first grid points passed by a movement path of a detection target on the pattern entry screen are specified among the plurality of first grid points and the second grid point, and entry pattern information is acquired based on the specified first grid points. In the determining, whether or not the entry pattern information matches registered pattern information is determined, and the electronic device is shifted from the locked state to the unlocked state upon determining that the entry pattern information matches the registered pattern information.

DETAILED DESCRIPTION

Figure 1:
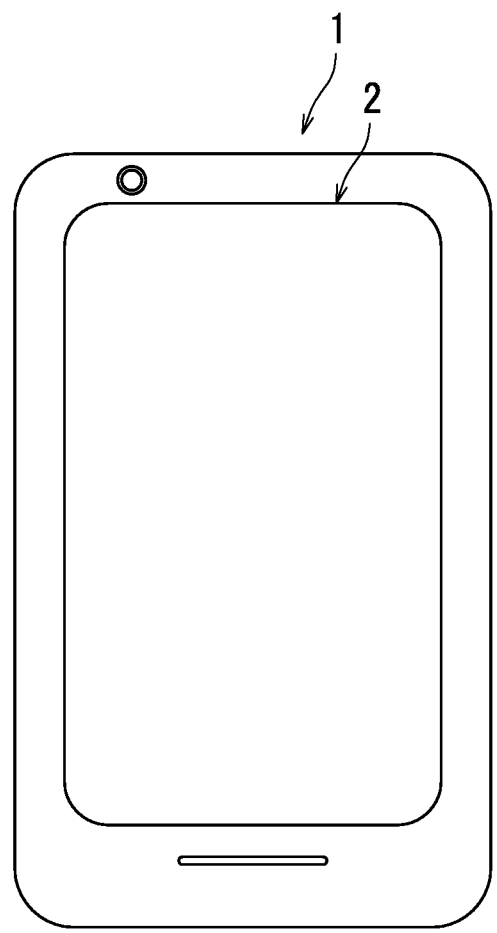
FIG. 1 is a diagram illustrating an electronic device according to a first embodiment of the present disclosure.

Embodiments of an electronic device and an authentication method according to the present disclosure will be described as follows with reference to the drawings. Note that elements within the drawings that are the same or equivalent are labelled with the same reference numerals and description thereof will not be repeated.

First Embodiment

First, an electronic device 1 according to a first embodiment of the present disclosure will be described with reference to FIG. 1. FIG. 1 is a diagram illustrating the electronic device 1 according to the first embodiment. According to the present embodiment, the electronic device 1 is a mobile terminal such as a smartphone.

As illustrated in FIG. 1, the electronic device 1 includes a touch panel 2. The touch panel 2 receives instructions of a user for the electronic device 1. In the present embodiment, one side in a lateral direction of the touch panel 2 illustrated in FIG. 1 will be described as an X1 side, and the other side in the short direction will be described as an X2 side. Also, one side in a longitudinal direction of the touch panel 2 will be described as a Y1 side, and the other side in the longitudinal direction will be described as a Y2 side. The lateral direction of the touch panel 2 will be described as an X axial direction, and the longitudinal direction of the touch panel 2 will be described as a Y axial direction.

The electronic device 1 according to the present embodiment performs an authentication process. When the authentication process is started, a pattern entry screen G1 is displayed on the touch panel 2. The authentication process is started when a detection target touches the touch panel 2, for example, in a case in which the electronic device 1 is in a locked state. The detection target is a finger of the user or a touch pen, for example. The user cannot use a function of the electronic device 1 when the electronic device 1 is in the locked state. By contrast, the user can use the function of the electronic device 1 when the authentication process succeeds and the electronic device 1 shifts from the locked state to an unlocked state. The function of the electronic device 1 is a telephone function, for example. Note that the electronic device 1 is in the locked state when a power state thereof is shifted from off to on.

Figure 2:
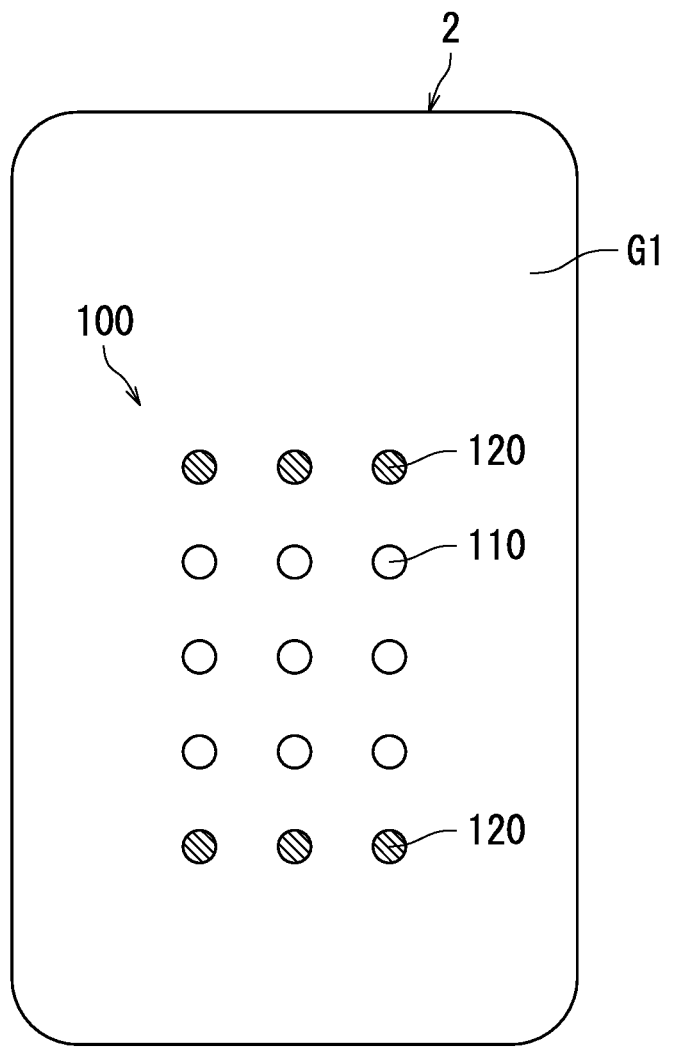
FIG. 2 is a diagram illustrating an example of a pattern entry screen according to the first embodiment of the present disclosure.
Figure 2:
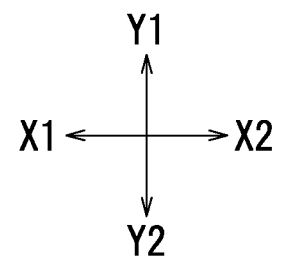

Next, the pattern entry screen G1 according to the present embodiment will be described with reference to FIG. 2. FIG. 2 is a diagram illustrating an example of the pattern entry screen G1 according to the first embodiment.

As illustrated in FIG. 2, the pattern entry screen G1 includes a plurality of grid points 100. According to the present embodiment, the pattern entry screen G1 includes fifteen grid points 100. Each of the fifteen grid points 100 is round. The fifteen grid points 100 all have the same shape and color.

The grid points 100 are arranged in a grid. In the example illustrated in FIG. 2, the fifteen grid points 100 are arranged in five rows and three columns. The grid points 100 include a plurality of authentication grid points 110 and at least one dummy grid point 120. According to the present embodiment, the fifteen grid points 100 include nine authentication grid points 110 (an example of first grid points) and six dummy grid points 120 (an example of second grid points). The number of the authentication grid points 110 and the number of the dummy grid points 120 are preset by the user. Note that the dummy grid points 120 are indicated by hatching for ease of understanding, but the authentication grid points 110 and the dummy grid points 120 have the same shape and color.

Each authentication grid point 110 is used for determination in the authentication process. No dummy grid points 120 are used for determination in the authentication process.

Figure 3:
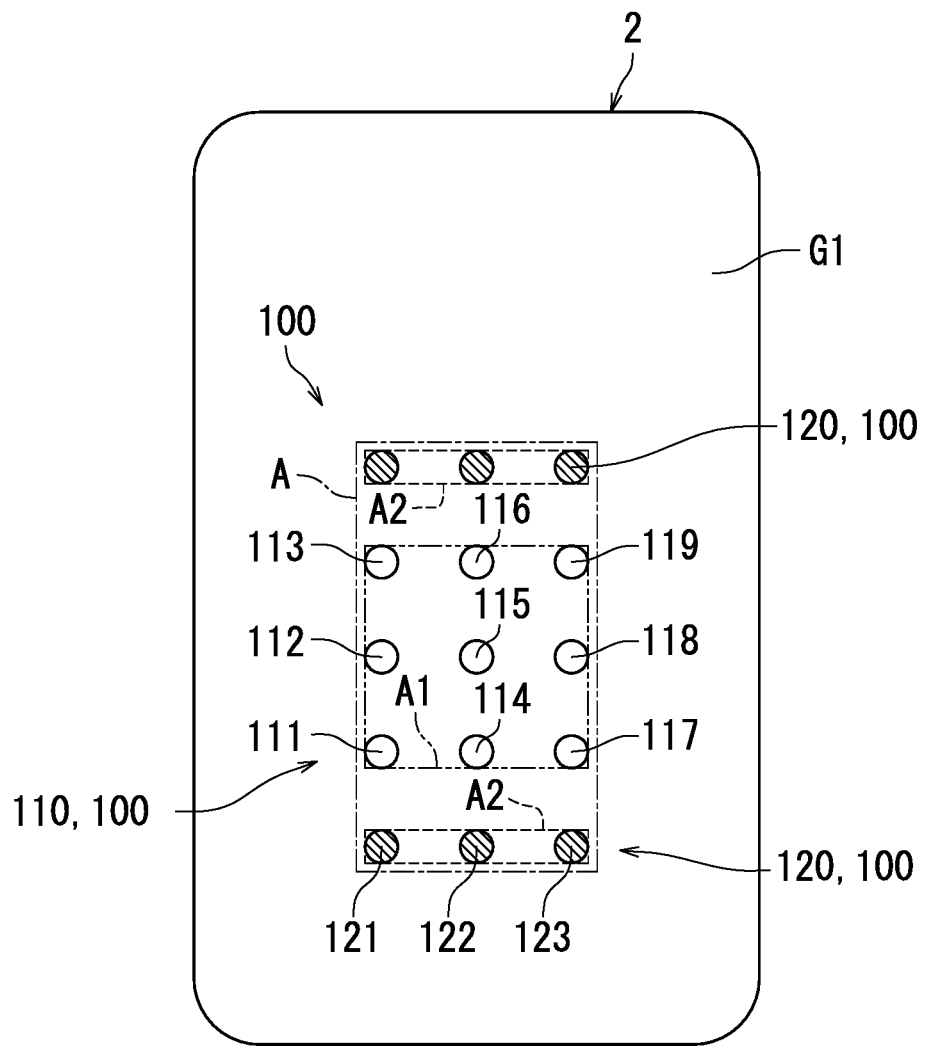
FIG. 3 is a diagram illustrating a grid point display area included in the pattern entry screen illustrated in FIG. 2.
Figure 3:
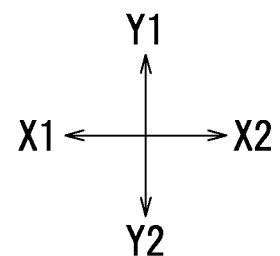

Next, the pattern entry screen G1 according to the present embodiment will be further described with reference to FIG. 3. FIG. 3 is a diagram illustrating a grid point display area A included in the pattern entry screen G1 illustrated in FIG. 2. In FIG. 3, the grid point display area A is enclosed by dashed and dotted lines for ease of understanding.

As illustrated in FIG. 3, the pattern entry screen G1 includes the grid point display area A. The grid point display area A is for displaying the grid points 100. In the example illustrated in FIG. 3, the grid point display area A is rectangular, and an outer circumference of the grid point display area A touches each of the outermost grid points 100 of the grid points 100.

The grid point display area A includes at least one first grid point display area A1 and at least one second grid point display area A2. In the example illustrated in FIG. 3, the grid point display area A includes a first grid point display area A1 and two second grid point display areas A2. In FIG. 3, the first grid point display area A1 is enclosed by dashed and double dotted lines. The second grid point display areas A2 are enclosed by dotted lines.

The first grid point display area A1 includes authentication grid points 110. In the example illustrated in FIG. 3, the first grid point display area A1 includes nine authentication grid points 110 (first to ninth authentication grid points 111 to 119). The nine authentication grid points 110 are arranged in three rows and three columns in the first grid point display area A1. In the following description, three authentication grid points 110 in a column on the X1 side from the Y2 side to the Y1 side are referred to as a first authentication grid point 111, a second authentication grid point 112, and a third authentication grid point 113. Three authentication grid points 110 in a center column from the Y2 side to the Y1 side are referred to as a fourth authentication grid point 114, a fifth authentication grid point 115, and a sixth authentication grid point 116. Three authentication grid points 110 in a column on the X2 side from the Y2 side to the Y1 side are referred to as a seventh authentication grid point 117, an eighth authentication grid point 118, and a ninth authentication grid point 119.

Each second grid point display area A2 includes dummy grid points 120. In the example illustrated in FIG. 3, each second grid point display area A2 includes three dummy grid points 120. In each second grid point display area A2, the three dummy grid points 120 are arranged in one row and three columns.

In the example illustrated in FIG. 3, each second grid point display area A2 is located outside of the first grid point display area A1 in the Y axial direction. In detail, one second grid point display area A2 of the two second grid point display areas A2 is located outside of the first grid point display area A1 on the Y1 side. The other second grid point display area A2 is located outside of the first grid point display area A1 on the Y2 side. In the following, the three dummy grid points 120 on the Y2 side from the X1 side to the X2 side will be referred to as a first dummy grid point 121, a second dummy grid point 122, and a third dummy grid point 123. According to the present embodiment, ranges of the first grid point display area A1 and the second grid point display areas A2 in the grid point display area A are pre-specified by the user.

Figure 4:
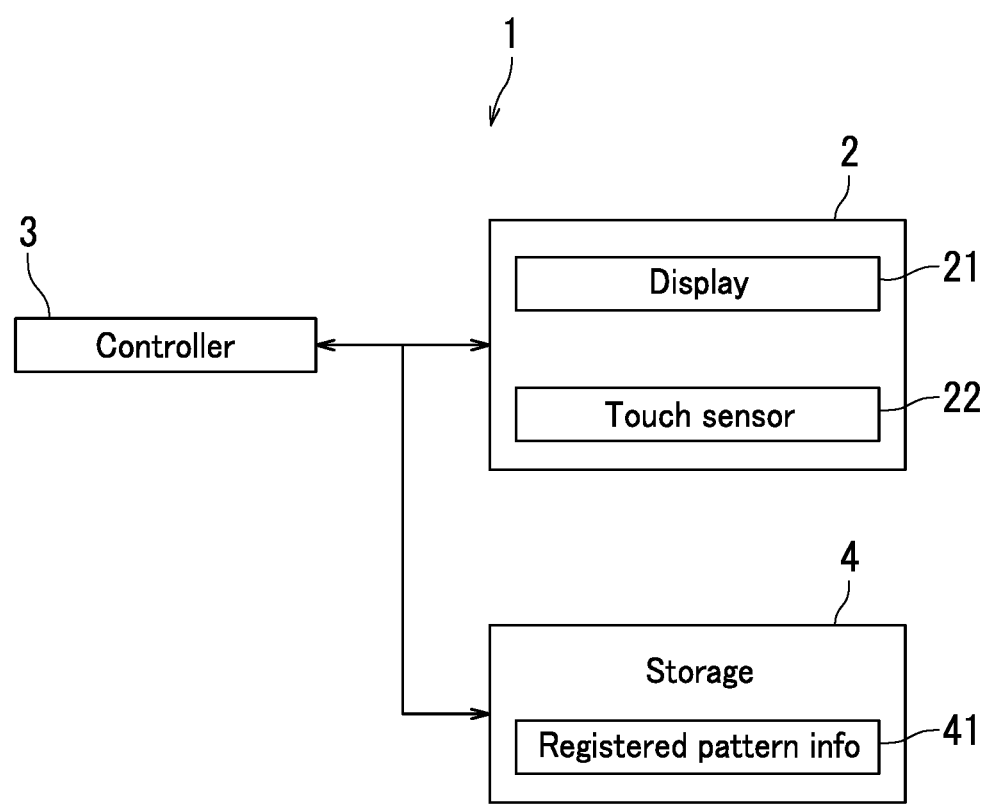
FIG. 4 is a diagram illustrating a configuration of the electronic device according to the first embodiment of the present disclosure.

Next, a configuration of the electronic device 1 according to the present embodiment will be described with reference to FIG. 4. FIG. 4 is a diagram illustrating the configuration of the electronic device 1 according to the first embodiment.

As illustrated in FIG. 4, the electronic device 1 includes a controller 3 and storage 4 in addition to the touch panel 2.

The touch panel 2 includes a display 21 and a touch sensor 22. The display 21 includes a liquid-crystal display or an organic electroluminescent display (ELD), for example. The touch sensor 22 is a resistive touch sensor, for example.

The display 21 displays items such as results of various processing performed by the controller 3. According to the present embodiment, the display 21 displays the pattern entry screen G1 described with reference to FIGS. 2 and 3.

Upon detecting a touch by the detection target, the touch sensor 22 generates a detection signal indicating a position in which the touch is detected.

The controller 3 includes a processor such as a central processing unit (CPU). The controller 3 controls operation of each section of the electronic device 1 by executing a control program stored in the storage 4. According to the present embodiment, the controller 3 executes the authentication process described with reference to FIG. 1.

The storage 4 typically includes semiconductor memory. Specifically, the storage 4 includes random-access memory (RAM) and read-only memory (ROM). The storage 4 stores the control program for controlling the operation of each section of the electronic device 1. The control program is executed by the controller 3. Note that the storage 4 may also include a storage device such as a hard disk drive (HDD) and a solid state drive (SSD).

The storage 4 stores registered pattern information 41 indicating a registered pattern. The registered pattern information 41 is preset by the user and stored in the storage 4. The registered pattern information 41 includes registered grid point information and registered order information. The registered grid point information defines authentication grid points 110 that must be passed (touched) by a movement path created by the detection target among the authentication grid points 110 described with reference to FIGS. 2 and 3. The registered order information defines an order in which the movement path must pass the authentication grid points 110.

Figure 5:
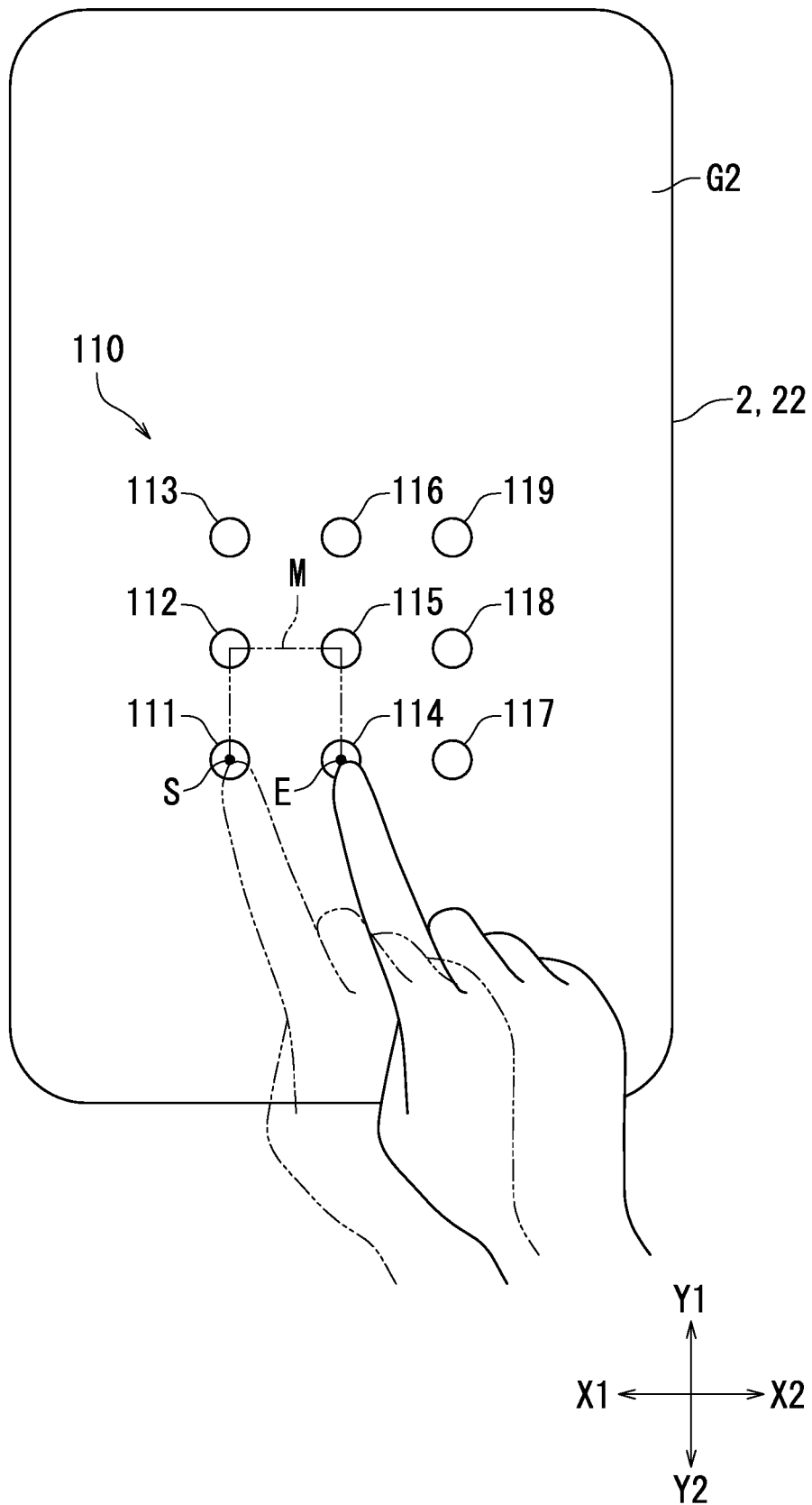
FIG. 5 is a diagram illustrating an example of a pattern registration screen according to the first embodiment of the present disclosure.

Next, a pattern registration screen G2 for setting the registered pattern information 41 according to the present embodiment will be described with reference to FIG. 5. FIG. 5 is a diagram illustrating an example of the pattern registration screen G2 according to the first embodiment. Note that FIG. 5 illustrates an example in which the user performs a setting operation of the registered pattern with a finger thereof.

The pattern registration screen G2 includes a plurality of authentication grid points 110 corresponding to the authentication grid points 110 included in the first grid point display area A1 described with reference to FIGS. 2 and 3. According to the present embodiment, the pattern registration screen G2 includes nine authentication grid points 110 arranged in three rows and three columns.

As illustrated in FIG. 5, the user can set the registered pattern information 41 by moving a finger so as to pass at least two authentication grid points 110 among the authentication grid points 110 while touching the touch panel 2 (touch sensor 22) to create a registration movement path M. In the example illustrated in FIG. 5, the registration movement path M passes the first authentication grid point 111, the second authentication grid point 112, the fifth authentication grid point 115, and the fourth authentication grid point 114 in the stated order. The storage 4 stores the registered grid point information and the registered order information in association with each other. In the example illustrated in FIG. 5, the registered grid point information indicates the first authentication grid point 111, the second authentication grid point 112, the fifth authentication grid point 115, and the fourth authentication grid point 114. The registered order information indicates an order in which the registration movement path M passes the first authentication grid point 111, the second authentication grid point 112, the fifth authentication grid point 115, and the fourth authentication grid point 114.

Figure 6:
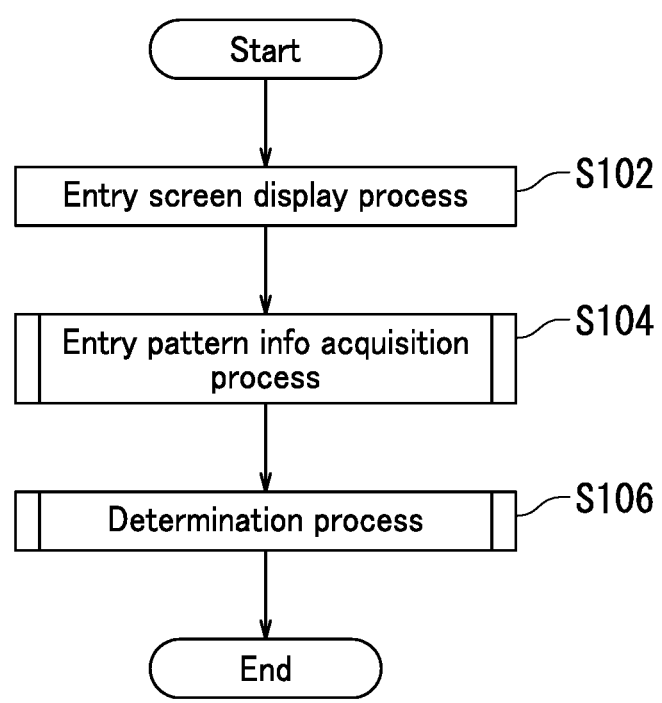
FIG. 6 is a flowchart illustrating an authentication process according to the first embodiment of the present disclosure.

Next, the authentication process according to the present embodiment will be described with reference to FIGS. 4 and 6. FIG. 6 is a flowchart illustrating the authentication process according to the first embodiment. The authentication process is started when the controller 3 receives the detection signal from the touch sensor 22, for example, in a case in which the electronic device 1 is in the locked state.

As illustrated in FIG. 6, the controller 3 performs an entry screen display process (Step S102). In detail, the controller 3 displays the pattern entry screen G1 on the display 21. Next, the controller 3 performs an entry pattern information acquisition process (Step S104). In detail, the controller 3 acquires a position of the detection target moving on the pattern entry screen G1 described with reference to FIGS. 2 and 3 based on the detection signal received from the touch sensor 22 and sequentially specifies the authentication grid points 110 passed by the detection target. In the present embodiment, the controller 3 sequentially specifies the authentication grid points 110 displayed in positions passed by the detection target. Specifically, the controller 3 sequentially specifies the authentication grid points 110 displayed in positions coinciding with positions in the X axial direction and the Y axial direction indicated by the detection signal sent from the touch sensor 22. In other words, the controller 3 sequentially specifies the authentication grid points 110 passed by an entry movement path (example of a movement path) of the detection target. The controller 3 acquires entry pattern information indicating an entry pattern by sequentially specifying the authentication grid points 110 passed by the entry movement path. In detail, every time an authentication grid point 110 is specified, the controller 3 acquires entry grid point information indicating the specified authentication grid point 110 and entry order information indicating the order in which the detection target (entry movement path) has passed the specified authentication grid point 110. Thus, the controller 3 acquires the entry pattern information based on the acquired entry grid point information and entry order information.

The controller 3 executes a determination process upon acquiring the entry pattern information (Step S106), and ends the authentication process.

Figure 7:
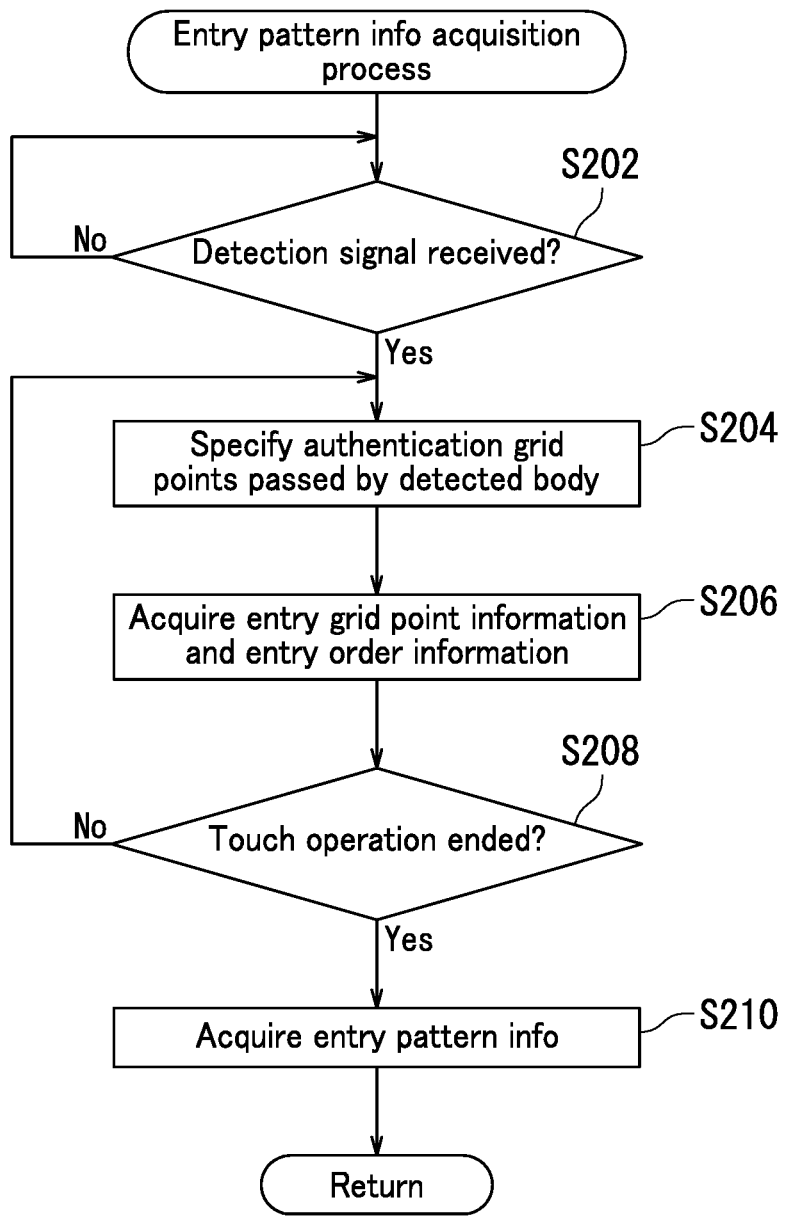
FIG. 7 is a flowchart illustrating an entry pattern information acquisition process according to the first embodiment of the present disclosure.

Next, the entry pattern information acquisition process (Step S104 in FIG. 6) according to the present embodiment will be described with reference to FIGS. 4, 6, and 7. FIG. 7 is a flowchart illustrating the entry pattern information acquisition process according to the first embodiment. The entry pattern information acquisition process is started when the pattern entry screen G1 described with reference to FIG. 2 is displayed on the display 21.

The controller 3 determines whether or not the detection signal has been received from the touch sensor 22 (Step S202). When the controller 3 determines that the detection signal has not been received from the touch sensor 22 (Step S202: No), the entry pattern information acquisition process returns to Step S202. Upon determining that the detection signal has been received from the touch sensor 22 by contrast (Step S202: Yes), the controller 3 specifies the authentication grid points 110 passed by the detection target (Step S204) based on the detection signal and acquires the entry grid point information and the entry order information (Step S206). The controller 3 temporarily stores the entry grid point information and the entry order information in the storage 4. Note that the controller 3 does not specify a dummy grid point 120 even when the detection target (entry movement path) passes the dummy grid point 120. In other words, when the detection target (entry movement path) passes an authentication grid point 110 and a dummy grid point 120, the controller 3 specifies only the authentication grid point 110 passed by the detection target (entry movement path) and does not specify the dummy grid point 120 passed by the detection target (entry movement path).

Next, the controller 3 determines whether or not a touch operation has ended (Step S208). In detail, the controller 3 determines whether or not the touch operation has ended depending on whether or not the detection signal is being received from the touch sensor 22. When the controller 3 determines that the touch operation has not ended (Step S208: No), the entry pattern information acquisition process returns to Step S204. Upon determining that the touch operation has ended by contrast (Step S208: Yes), the controller 3 acquires the entry pattern information based on the acquired entry grid point information and entry order information (Step S210) and returns the process to Step S106 illustrated in FIG. 6.

Figure 8:
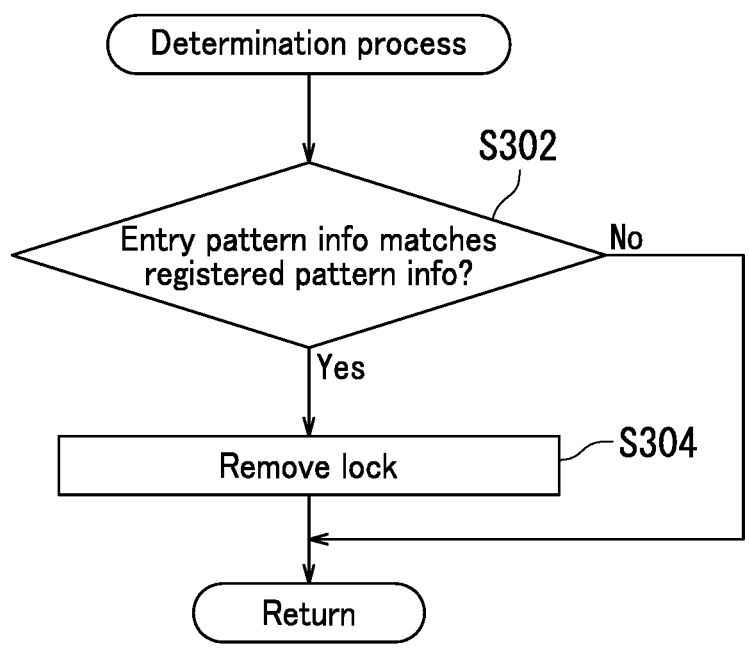
FIG. 8 is a flowchart illustrating a determination process according to the first embodiment of the present disclosure.

Next, the determination process (Step S106 in FIG. 6) according to the present embodiment will be described with reference to FIGS. 4, 6, and 8. FIG. 8 is a flowchart illustrating the determination process according to the first embodiment. The determination process is started when the controller 3 acquires the entry pattern information.

As illustrated in FIG. 8, the controller 3 determines whether or not the entry pattern information matches the registered pattern information 41 (Step S302). Upon determining that the entry pattern information matches the registered pattern information 41 (Step S302: Yes), the controller 3 shifts the electronic device 1 from the locked state to a lock removed state (unlocked state) (Step S304) and ends the authentication process illustrated in FIG. 6. Upon determining that the entry pattern information does not match the registered pattern information 41 by contrast (Step S302: No), the controller 3 keeps the electronic device 1 in the locked state and the authentication process illustrated in FIG. 6 ends.

Next, an input operation of the entry pattern information according to the present embodiment will be described with reference to FIGS. 4, 5, and 9A to 10B. Note that FIGS. 9A to 10B illustrate examples in which the user performs an entry operation of the entry pattern information with a finger thereof.

Figure 9A:
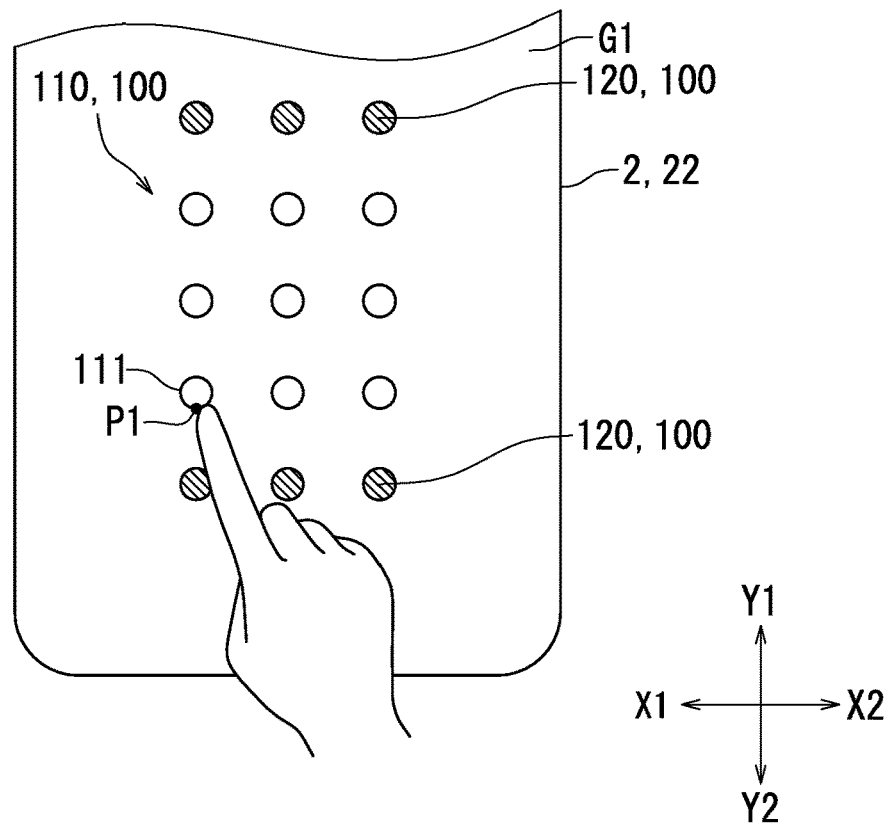
FIGS. 9A and 9B are diagrams illustrating an example of an entry operation of entry pattern information according to the first embodiment of the present disclosure.
Figure 9B:
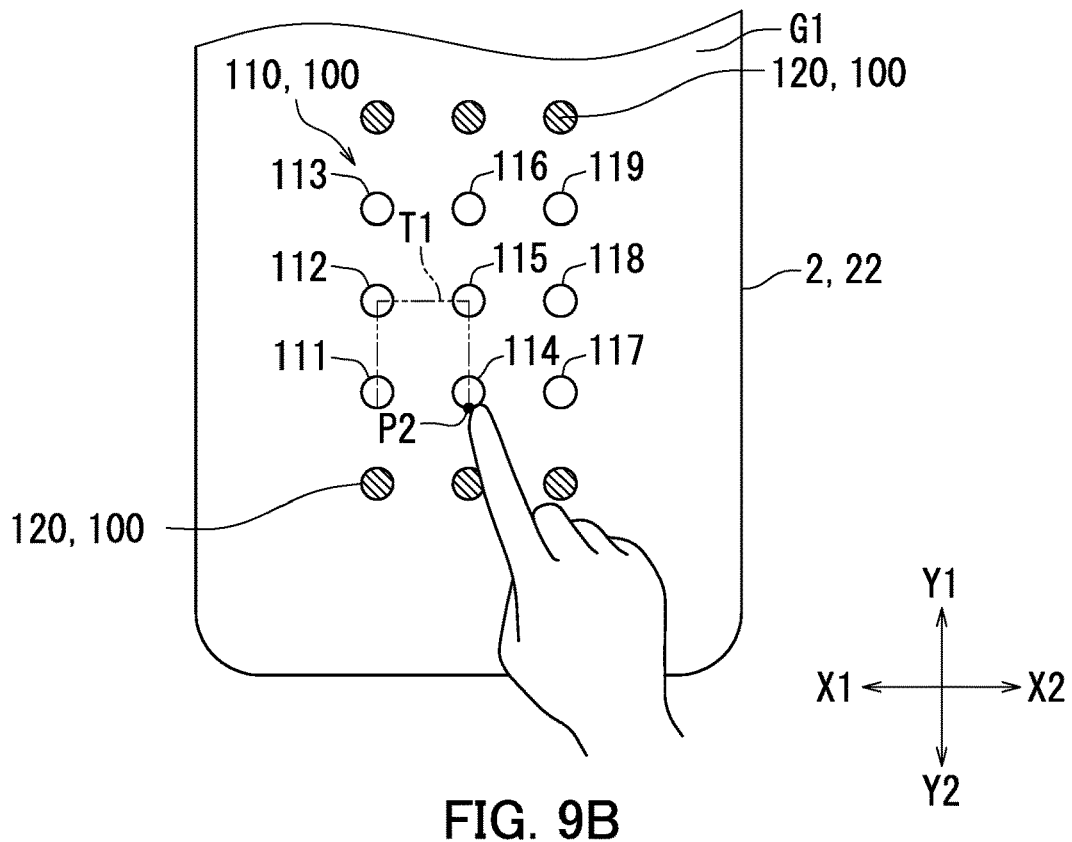

FIGS. 9A and 9B are diagrams illustrating an example of the entry operation of the entry pattern information according to the first embodiment.

As illustrated in FIGS. 9A and 9B, the controller 3 sequentially specifies the authentication grid points 110 passed by a first entry movement path T1 (finger) when the finger of the user moves from a first position P1 to a second position P2 while touching the touch panel 2 (touch sensor 22) so as to create the first entry movement path T1.

The controller 3 acquires the entry pattern information upon determining that the finger of the user has separated from the touch sensor 22 and the touch operation has ended. The entry pattern information includes the entry grid point information indicating the specified authentication grid points 110 and the entry order information indicating the order in which the authentication grid points 110 are specified.

In the example illustrated in FIGS. 9A and 9B, the first entry movement path T1 passes the first authentication grid point 111, the second authentication grid point 112, the fifth authentication grid point 115, and the fourth authentication grid point 114 in the stated order. Accordingly, the controller 3 specifies the first authentication grid point 111, the second authentication grid point 112, the fifth authentication grid point 115, and the fourth authentication grid point 114 in the stated order. Therefore, the entry pattern information includes the entry grid point information indicating the first authentication grid point 111, the second authentication grid point 112, the fifth authentication grid point 115, and the fourth authentication grid point 114, and the entry order information indicating the order in which the authentication grid points 110 are specified.

The entry pattern information entered through the entry operation illustrated in FIGS. 9A to 9B matches the registered pattern information 41 described with reference to FIG. 5. In detail, the entry grid point information included in the entry pattern information matches the registered grid point information included in the registered pattern information 41, and the entry order information included in the entry pattern information matches the registered order information included in the registered pattern information 41. Therefore, the controller 3 determines that the entry pattern information matches the registered pattern information 41 and shifts the electronic device 1 from the locked state to the unlocked state.

Figure 10A:
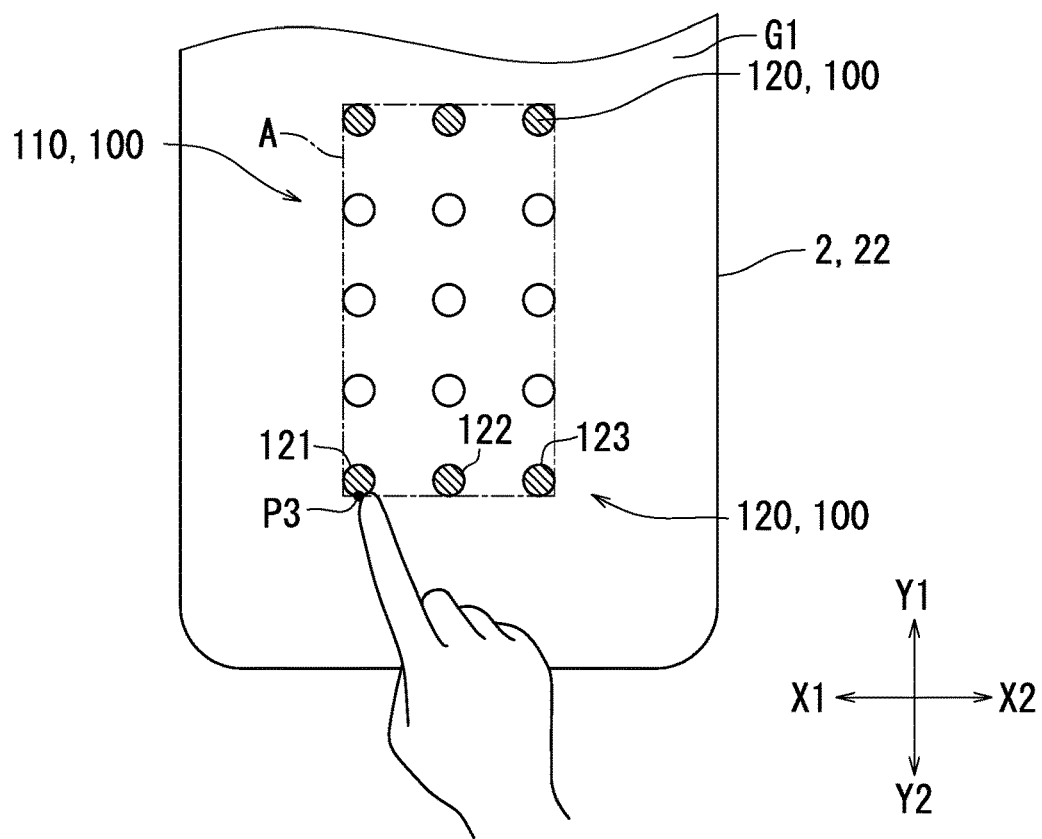
FIGS. 10A and 10B are diagrams illustrating another example of the entry operation of the entry pattern information according to the first embodiment of the present disclosure.
Figure 10B:
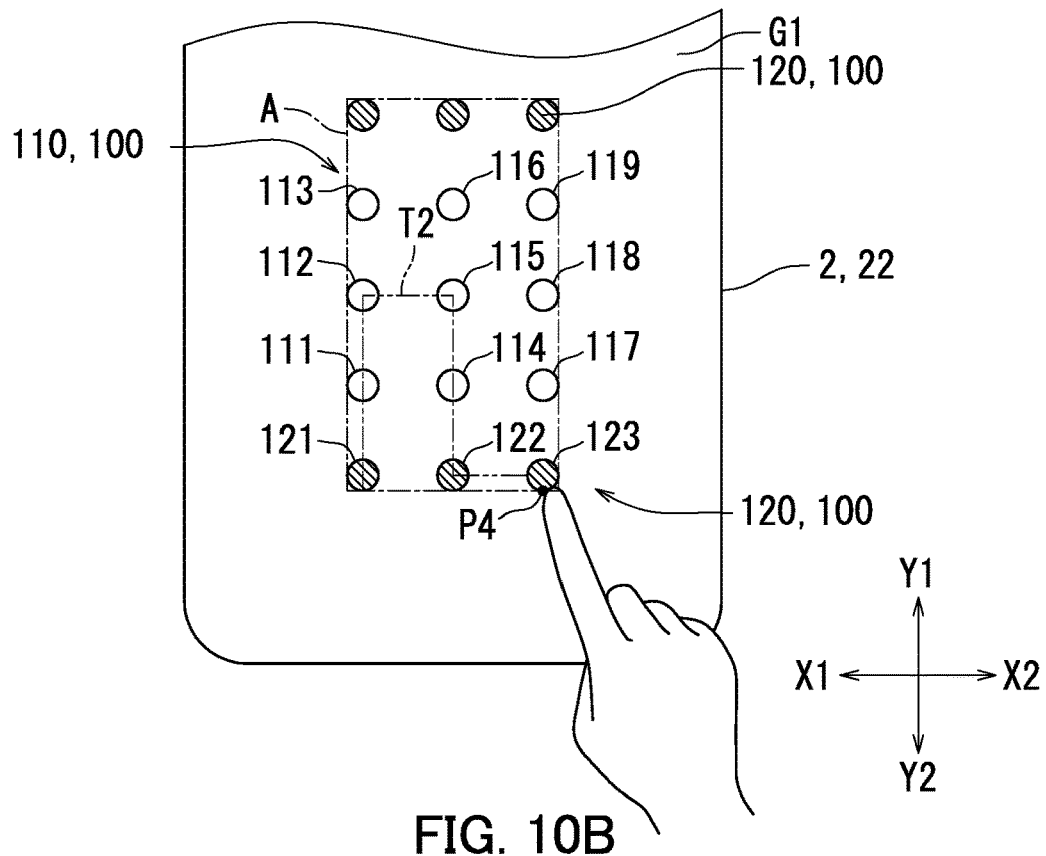

Next, another example of the input operation of the entry pattern information according to the present embodiment will be described with reference to FIGS. 4, 5, and 9A to 10B. FIGS. 10A and 10B are diagrams illustrating the example of the entry operation of the entry pattern information according to the first embodiment. In detail, an entry movement path created in the entry operation illustrated in FIGS. 10A and 10B differs from the entry movement path created in the entry operation described with reference to FIGS. 9A and 9B.

As illustrated in FIGS. 10A and 10B, the controller 3 sequentially specifies authentication grid points 110 passed by a second entry movement path T2 (finger) when a finger of the user moves from a third position P3 to a fourth position P4 while touching the touch panel 2 (touch sensor 22) so as to create the second entry movement path T2.

The controller 3 acquires the entry pattern information upon determining that the touch operation has ended.

In the example illustrated in FIGS. 10A and 10B, the second entry movement path T2 passes the first dummy grid point 121, the first authentication grid point 111, the second authentication grid point 112, the fifth authentication grid point 115, the fourth authentication grid point 114, the second dummy grid point 122, and the third dummy grid point 123 in the stated order. As described with reference to FIG. 7, the controller 3 specifies only the authentication grid points 110 without specifying the dummy grid points 120 when authentication grid points 110 and dummy grid points 120 are included in the grid points 100 passed by the second entry movement path T2. Accordingly, the controller 3 specifies the first authentication grid point 111, the second authentication grid point 112, the fifth authentication grid point 115, and the fourth authentication grid point 114 in the stated order. Therefore, the entry pattern information includes the entry grid point information indicating the first authentication grid point 111, the second authentication grid point 112, the fifth authentication grid point 115, and the fourth authentication grid point 114, and the entry order information indicating the order in which the authentication grid points 110 are specified.

The entry pattern information entered by the entry operation illustrated in FIGS. 10A and 10B matches the registered pattern information 41 described with reference to FIG. 5 as in the case of the entry pattern information entered by the entry operation illustrated in FIGS. 9A and 9B. In detail, the entry grid point information included in the entry pattern information matches the registered grid point information included in the registered pattern information 41 and the entry order information included in the entry pattern information matches the registered order information included in the registered pattern information 41. Therefore, the controller 3 determines that the entry pattern information matches the registered pattern information 41 and shifts the electronic device 1 from the locked state to the unlocked state.

The entry pattern information entered through the entry operation illustrated in FIGS. 10A and 10B matches the entry pattern information entered through the entry operation illustrated in FIGS. 9A and 9B. Accordingly, the user can successfully perform the authentication process by moving a finger so as to include dummy grid points 120 to create a different entry movement path than the registration movement path M described with reference to FIG. 5.

The first embodiment has been described above. According to the present embodiment, the electronic device 1 displays the pattern entry screen G1 including the dummy grid points 120 on the display 21. The dummy grid points 120 are grid points 100 that are not used for determination in the authentication process. The user can successfully perform the authentication process by moving a finger so as to pass a dummy grid point 120. Herewith, the registered pattern can be prevented from being known by another person who has stolen a glance at motion of the finger of the user. Accordingly, unauthorized use of the electronic device 1 by another person can be prevented through a simple configuration.

Figure 11A:
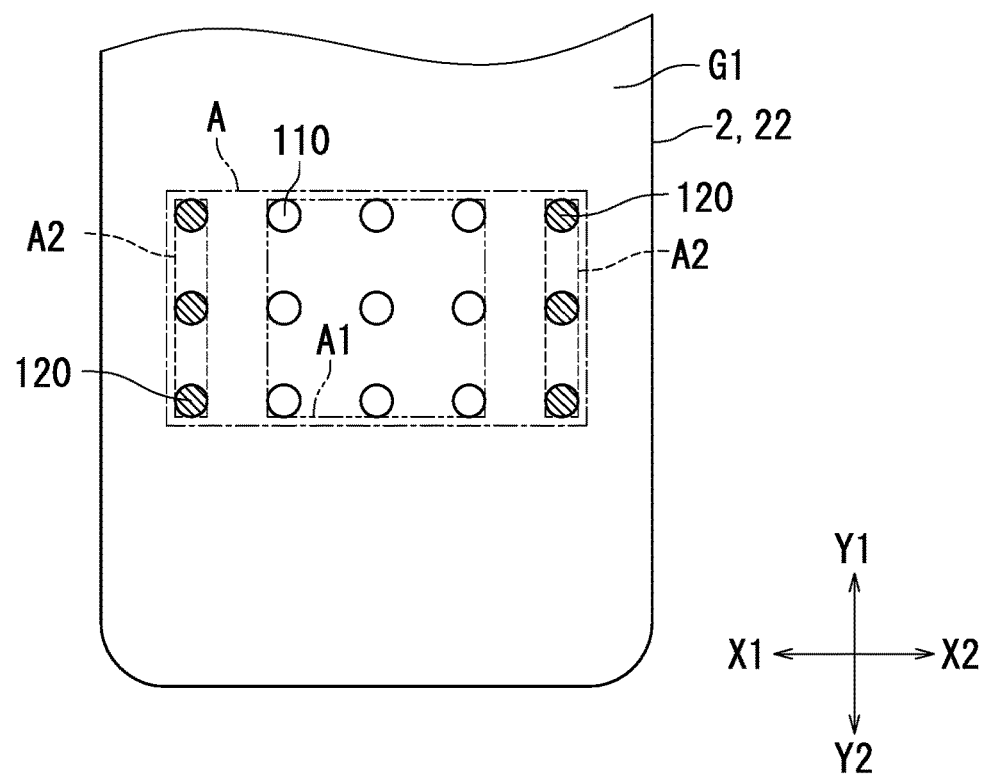
FIGS. 11A and 11B are diagrams illustrating other examples of the pattern entry screen according to the first embodiment of the present disclosure.
Figure 11B:
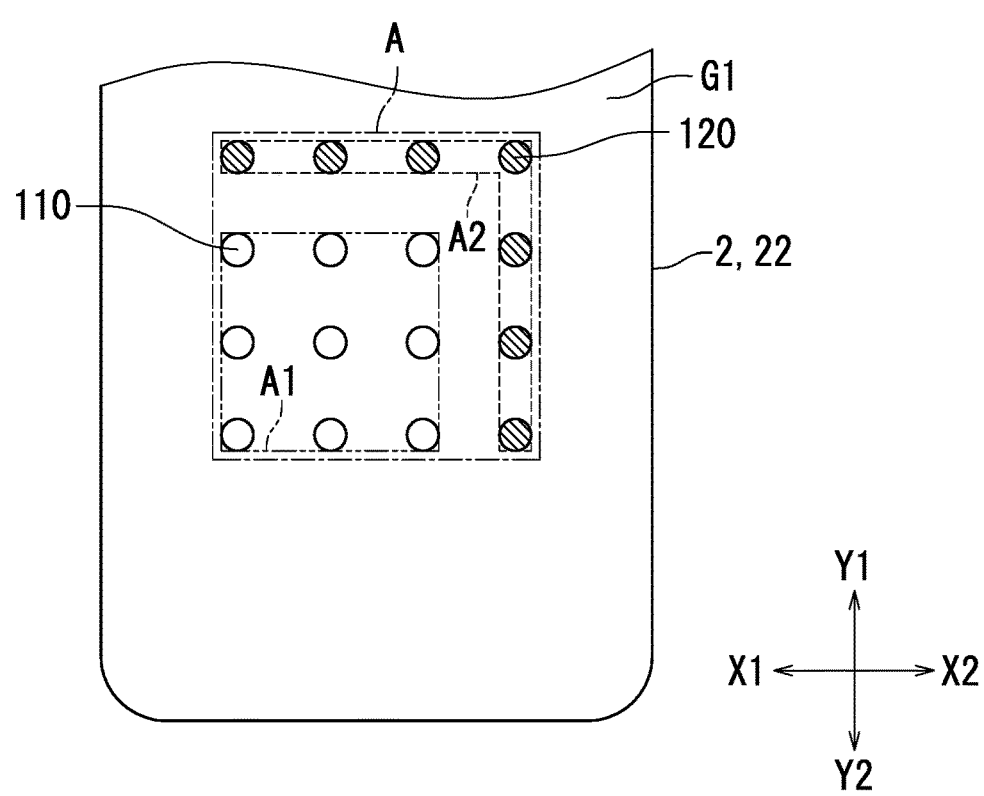

Note that according to the present embodiment, an example is described in which the second grid point display areas A2 are located outside of the first grid point display area A1 in the Y axial direction. However, the positions of the second grid point display areas A2 are not particularly limited as long as the second grid point display areas A2 are within the range of the grid point display area A. FIGS. 11A and 11B are diagrams illustrating other examples of the pattern entry screen G1 according to the first embodiment. For example, as illustrated in FIG. 11A, the second grid point display areas A2 may be located outside of the first grid point display area A1 in the X axial direction. Alternatively, as illustrated in FIG. 11B, the second grid point display areas A2 may be located outside of the first grid point display area A1 on the Y1 side and the X2 side.

The user may specify the first grid point display area A1 at the start of the authentication process. Specifically, the user may specify the first grid point display area A1 by moving a finger on the touch panel 2 so as to surround grid points 100 to be set as authentication grid points 110 from the grid points 100 included in the pattern entry screen G1 after the pattern entry screen G1 is displayed on the touch panel 2. The registered pattern information 41 can be further prevented from being known by another person through the user setting the authentication grid points 110 at the start of the authentication process. Therefore, unauthorized use by another person can be further prevented. Note that the user may specify the first grid point display area A1 every time the authentication process is started (each time the pattern entry screen G1 is displayed on the display 21). Herewith, unauthorized use by another person can be further prevented.

Also according to the present embodiment, an example is described in which the grid point display area A has one first grid point display area A1. However, the grid point display area A may have two or more first grid point display areas A1.

Also according to the present embodiment, a configuration is described with multiple dummy grid points 120. However, the number of dummy grid points 120 may be only one.

Second Embodiment

Continuing, a second embodiment of the present disclosure will be described with reference to FIGS. 12A to 14B. The second embodiment differs from the first embodiment in that in the second embodiment, a controller 3 randomly changes positions of a first grid point display area A1 and second grid point display areas A2. In the following, items of the second embodiment that differ from the first embodiment will be described. Description of elements that are shared with the first embodiment will be omitted.

Figure 12A:
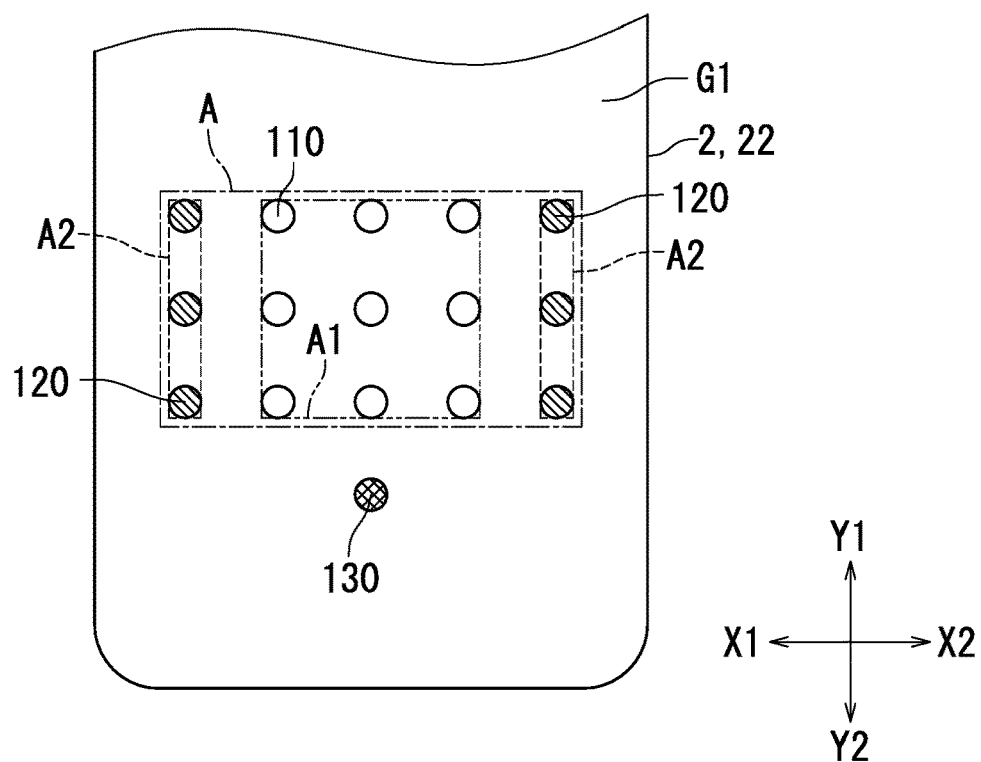
FIG. 12A is a diagram illustrating an example of a pattern entry screen according to a second embodiment of the present disclosure.
Figure 12B:
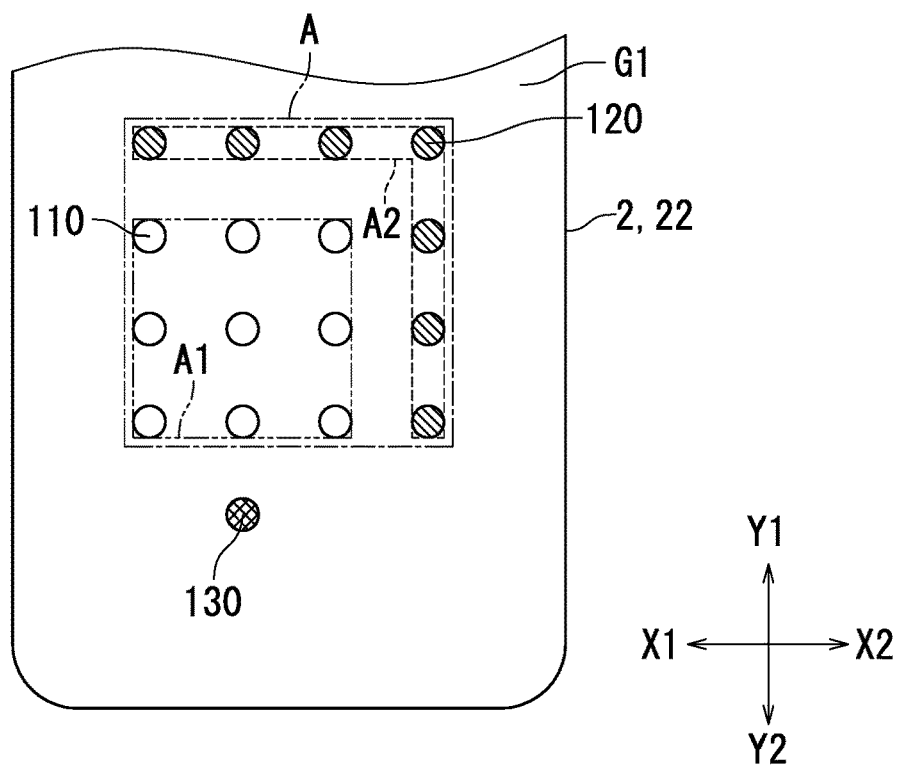
FIG. 12B is a diagram illustrating another example of the pattern entry screen according to the second embodiment of the present disclosure.

FIG. 12A is a diagram illustrating an example of a pattern entry screen G1 according to the second embodiment. FIG. 12B is a diagram illustrating another example of the pattern entry screen G1 according to the second embodiment. In detail, the pattern entry screen G1 illustrated in FIG. 12A indicates a pattern entry screen G1 displayed on the display 21 in a previous authentication process. The pattern entry screen G1 illustrated in FIG. 12B indicates a pattern entry screen G1 displayed on the display 21 in a current authentication process. According to the present embodiment, a user presets the number of authentication grid points 110 to nine and the number of dummy grid points 120 to six. The user also presets the first grid point display area A1 such that the authentication grid points 110 are arranged in three rows and three columns.

As illustrated in FIGS. 12A and 12B, the positions of the first grid point display area A1 and the second grid point display areas A2 in the grid point display area A differ between the pattern entry screen G1 illustrated in FIG. 12A and the pattern entry screen G1 illustrated in FIG. 12B. The controller 3 randomly changes the positions of the first grid point display area A1 and the second grid point display areas A2 in the grid point display area A each time the pattern entry screen G1 is displayed on a touch panel 2.

As illustrated in FIGS. 12A and 12B, the pattern entry screen G1 further includes an authentication grid point mark 130. The authentication grid point mark 130 is an example of authentication grid point information. According to the present embodiment, the authentication grid point mark 130 is displayed outside of the grid point display area A.

The authentication grid point mark 130 notifies the user of the position of the first grid point display area A1 (authentication grid points 110). The authentication grid point mark 130 is displayed in the pattern entry screen G1 so as to indicate the position of the first grid point display area A1 in the grid point display area A according to a rule pre-established by the user. In the examples illustrated in FIGS. 12A and 12B, the authentication grid point mark 130 indicates a center position of the first grid point display area A1. Note that in FIGS. 12A and 12B, the authentication grid point mark 130 is illustrated with double hatching for ease of understanding, but the authentication grid point mark 130 has the same shape and color as the grid points 100.

The user can know the position of the first grid point display area A1 (position of the authentication grid points 110) in the grid point display area A based on the authentication grid point mark 130 during the authentication process.

Figure 13A:
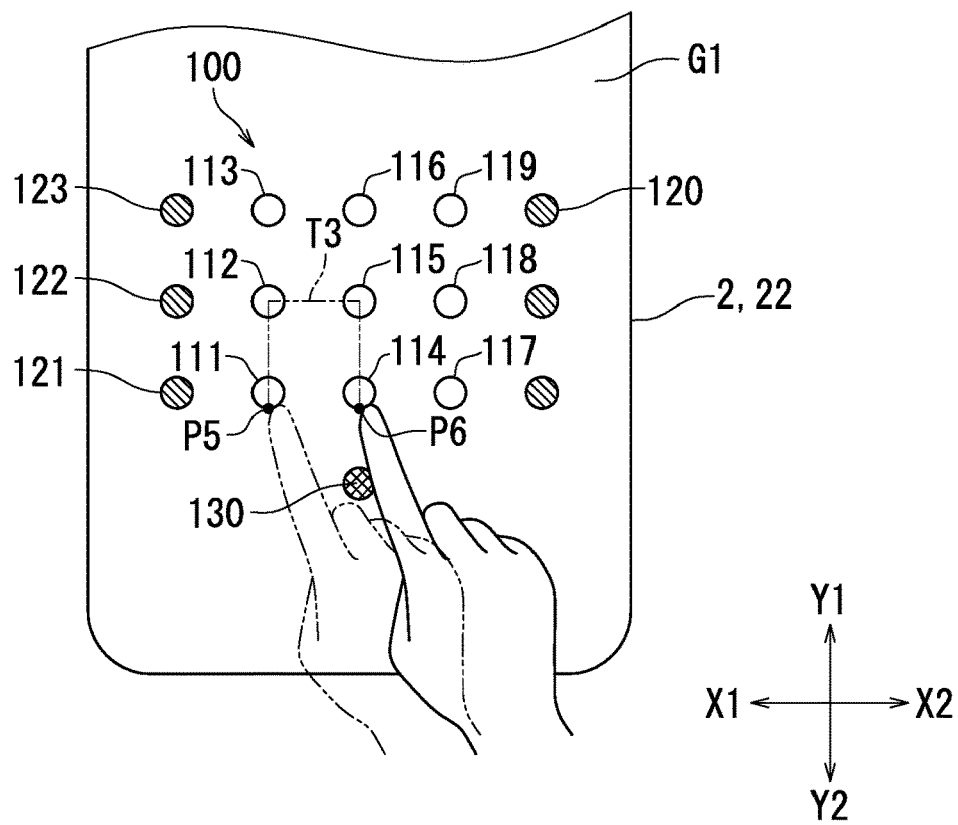
FIG. 13A is a diagram illustrating an example of an entry operation of entry pattern information according to the second embodiment of the present disclosure.

Next, an entry operation of entry pattern information according to the second embodiment will be described with reference to FIGS. 13A and 13B. FIG. 13A is a diagram illustrating an example of the entry operation of the entry pattern information according to the second embodiment.

As illustrated in FIG. 13A, the controller 3 sequentially specifies authentication grid points 110 passed by a third entry movement path T3 when a finger of the user moves from a fifth position P5 to a sixth position P6 while touching the touch panel 2 so as to create the third entry movement path T3.

In the example illustrated in FIG. 13A, the third entry movement path T3 passes a first authentication grid point 111, a second authentication grid point 112, a fifth authentication grid point 115, and a fourth authentication grid point 114 in the stated order. Accordingly, the controller 3 specifies the first authentication grid point 111, the second authentication grid point 112, the fifth authentication grid point 115, and the fourth authentication grid point 114 in the stated order. Therefore, the entry pattern information includes entry grid point information indicating the first authentication grid point 111, the second authentication grid point 112, the fifth authentication grid point 115, and the fourth authentication grid point 114, and entry order information indicating the order in which the authentication grid points 110 are specified.

Figure 13B:
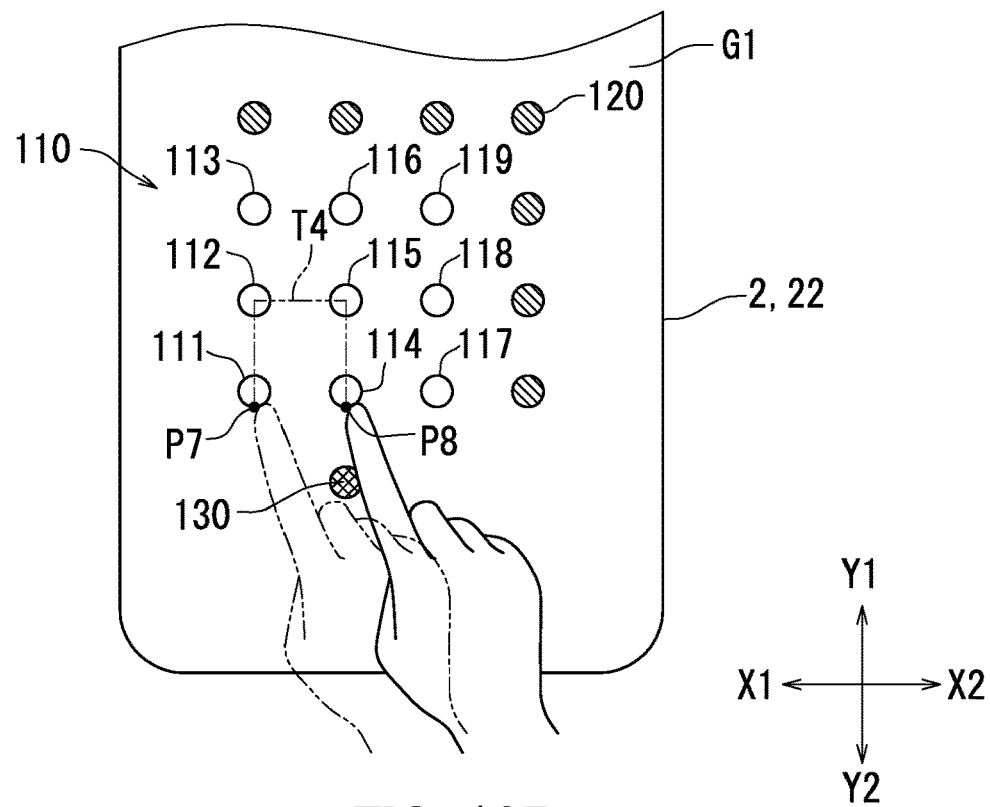
FIG. 13B is a diagram illustrating another example of the entry operation of the entry pattern information according to the second embodiment of the present disclosure.

FIG. 13B is a diagram illustrating another example of the entry operation of the entry pattern information according to the second embodiment. In detail, the entry operation illustrated in FIG. 13B differs from the entry operation described with reference to FIG. 13A in that the entry movement path is different.

As illustrated in FIG. 13B, the controller 3 sequentially specifies authentication grid points 110 passed by a fourth entry movement path T4 when a finger of the user moves from a seventh position P7 to an eighth position P8 while touching the touch panel 2 so as to create the fourth entry movement path T4.

In the example illustrated in FIG. 13B, the fourth entry movement path T4 passes the first authentication grid point 111, the second authentication grid point 112, the fifth authentication grid point 115, and the fourth authentication grid point 114 in the stated order. Accordingly, the controller 3 specifies the first authentication grid point 111, the second authentication grid point 112, the fifth authentication grid point 115, and the fourth authentication grid point 114 in the stated order. Therefore, the entry pattern information includes the entry grid point information indicating the first authentication grid point 111, the second authentication grid point 112, the fifth authentication grid point 115, and the fourth authentication grid point 114, and the entry order information indicating the order in which the authentication grid points 110 are specified.

The entry pattern information described with reference to FIG. 13A matches the entry pattern information described with reference to FIG. 13B. By contrast, in the examples illustrated in FIGS. 13A and 13B, the position in which the entry pattern information is entered changes. Accordingly, the user can change the entry operation (position in which the entry operation is performed) without operating so as to pass a dummy grid point 120 when entering the entry pattern information. Therefore, registered pattern information 41 can be prevented from being known by another person.

The second embodiment has been described above. According to the present embodiment, the controller 3 randomly changes positions of the authentication grid points 110 each time the pattern entry screen G1 is displayed. Accordingly, unauthorized use of an electronic device 1 by another person can be prevented.

Note that according to the present embodiment, the user performs the entry operation of the entry pattern information without using a dummy grid point 120. However, the user may use a dummy grid point 120 to perform the entry operation of the entry pattern information. Herewith, motion of a finger of the user can look more complicated. As a result, the registered pattern information 41 can be further prevented from being known by another person. Accordingly, unauthorized use of the electronic device 1 by another person can be prevented.

According to the present embodiment, the authentication grid point mark 130 is displayed on the display 21. The authentication grid point mark 130 notifies the user of the position of the first grid point display area A1 in the grid point display area A according to a rule pre-established by the user. In other words, only the user can know the position of the authentication grid points 110 among the grid points 100. As a result, the registered pattern information 41 can be prevented from being known by another person.

Figure 14A:
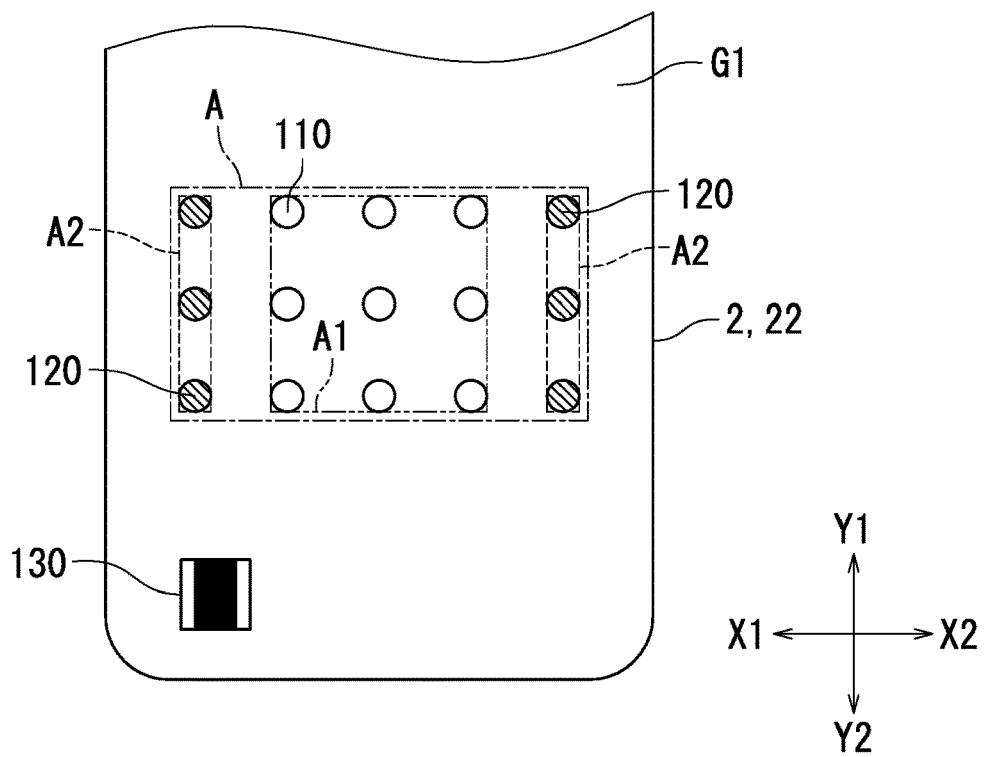
FIGS. 14A and 14B are diagrams illustrating examples of an authentication grid point mark according to the second embodiment of the present disclosure.
Figure 14B:
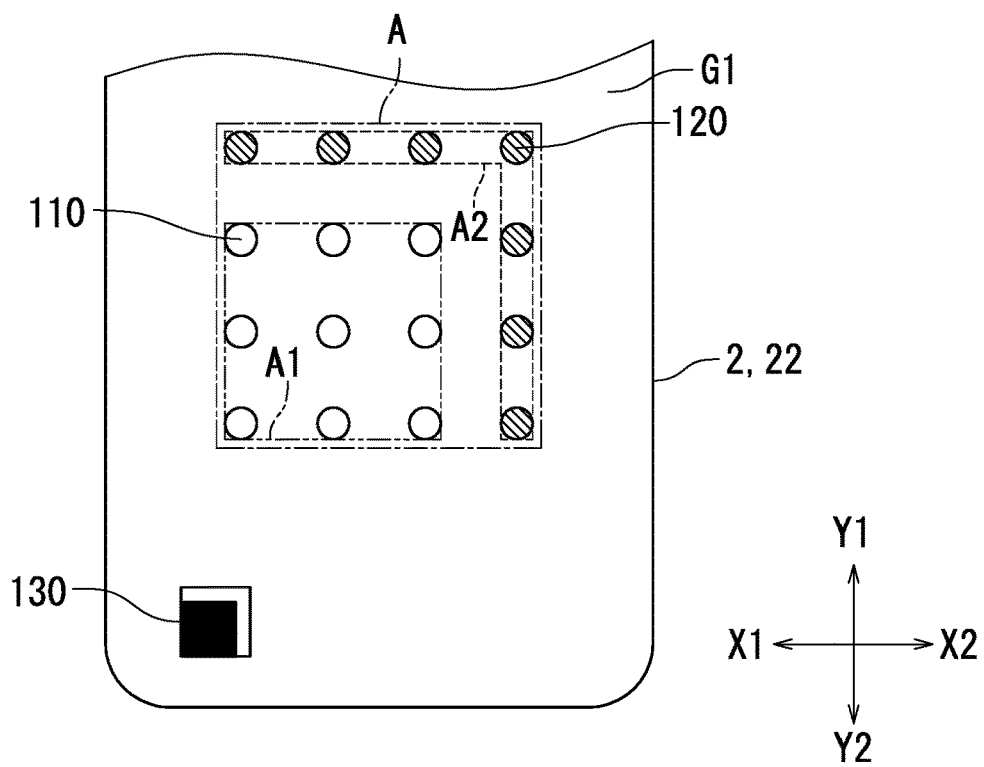

Note that according to the present embodiment, an example is described in which the authentication grid point mark 130 has the same shape and color as the grid points 100. However, the authentication grid point mark 130 need only notify the user of the position of the authentication grid points 110. FIGS. 14A and 14B are diagrams illustrating other examples of the authentication grid point mark 130 according to the second embodiment. As illustrated in FIGS. 14A and 14B, the authentication grid point mark 130 may be a diagram indicating an area (first grid point display area A1) in which the authentication grid points 110 are located in the grid point display area A.

Also according to the present embodiment, an example is described in which the user is notified of the authentication grid point information by displaying the authentication grid point mark 130 on the display 21. However, the configuration by which the user is notified of the authentication grid point information is not particularly limited as long as the user may be notified of the position of the first grid point display area A1. For example, the controller 3 may notify the user of the authentication grid point information by illuminating the first grid point display area A1 for a predetermined time (one second, for example) from when the display of the pattern entry screen G1 starts. Alternatively, the controller 3 may notify the user of the authentication grid point information by using an LED lamp or the like pre-included in the electronic device 1.

Also according to the present embodiment, an example is described in which the number of authentication grid points 110 and the number of the dummy grid points 120 are preset. However, the number of the authentication grid points 110 and the number of the dummy grid points 120 may be changed each time the pattern entry screen G1 is displayed on the display 21.

The embodiments of the present disclosure have been described above with reference to the drawings (FIGS. 1 to 14B). However, the present disclosure is not limited to the above embodiments and may be implemented in various manners within a scope not departing from the gist thereof. Furthermore, numerical values and shapes illustrated in the above embodiments are one example and not particularly limited. Various alterations are possible within a scope not substantially departing from the effects of the present disclosure.

For example, according to the embodiments of the present disclosure, each grid point 100 is round. However, the shape of the grid points 100 is not limited to being round, and may be rectangular, for example.

Furthermore, according to the embodiments of the present disclosure, an example is described in which the electronic device 1 is a smartphone. However, the present disclosure is not limited hereto. The present disclosure may also be applied to an electronic device such as a tablet computer, for example.

What is claimed is:

1. An electronic device which shifts between a locked state in which use of a function is restricted and an unlocked state in which the function is usable, the electronic device comprising:
    a touch panel configured to display a pattern entry screen including a plurality of first grid points and a second grid point having the same shape and color as the plurality of first grid points; and
    a controller configured to acquire a movement path of a detection target on the pattern entry screen and sequentially specify first grid points passed by the movement path among the plurality of first grid points and the second grid point, wherein
    the controller specifies only the first grid points passed by the movement path and does not specify the second grid point passed by the movement path when the movement path passes the first grid points and the second grid point,
    the controller acquires entry pattern information based on the specified first grid points,
    the controller determines whether or not the entry pattern information matches registered pattern information, and
    when the controller determines that the entry pattern information matches the registered pattern information, the electronic device shifts from the locked state to the unlocked state.

2. The electronic device according to claim 1, wherein
    the pattern entry screen has a grid point display area in which the plurality of first grid points and the second grid point are displayed,
    the grid point display area includes:
        a first grid point display area in which the plurality of first grid points are displayed; and
        a second grid point display area in which the second grid point is displayed, and
    the second grid point display area is located outside of the first grid point display area.

3. The electronic device according to claim 2, wherein
    the controller notifies a user of authentication grid point information, and
    the authentication grid point information indicates a center position of the first grid point display area.

4. The electronic device according to claim 2, wherein
    the controller notifies a user of authentication grid point information, and
    the authentication grid point information indicates a position of the first grid point display area in the grid point display area.

5. The electronic device according to claim 3, wherein
    the controller displays the authentication grid point information on the touch panel.

6. The electronic device according to claim 5, wherein
    the touch panel displays the authentication grid point information outside of the grid point display area.

7. The electronic device according to claim 1, wherein
    the controller acquires the entry pattern information based on positions of the first grid points passed by the movement path and an order in which the first grid points are passed.

8. An authentication method for shifting an electronic device between a locked state in which use of a function is restricted and an unlocked state in which the function is usable, the authentication method comprising:
    displaying a pattern entry screen including a plurality of first grid points and a second grid point having the same shape and color as the first grid points;
    acquiring, upon specifying only first grid points passed by a movement path of a detection target on the pattern entry screen among the plurality of first grid points and the second grid point, entry pattern information based on the specified first grid points; and
    determining whether or not the entry pattern information matches registered pattern information, and shifting the electronic device from the locked state to the unlocked state upon determining that the entry pattern information matches the registered pattern information.

* * * * *